May 9, 1939. H. W. LANG 2,157,793
AUTOMOBILE FENDER
Filed Aug. 5, 1938
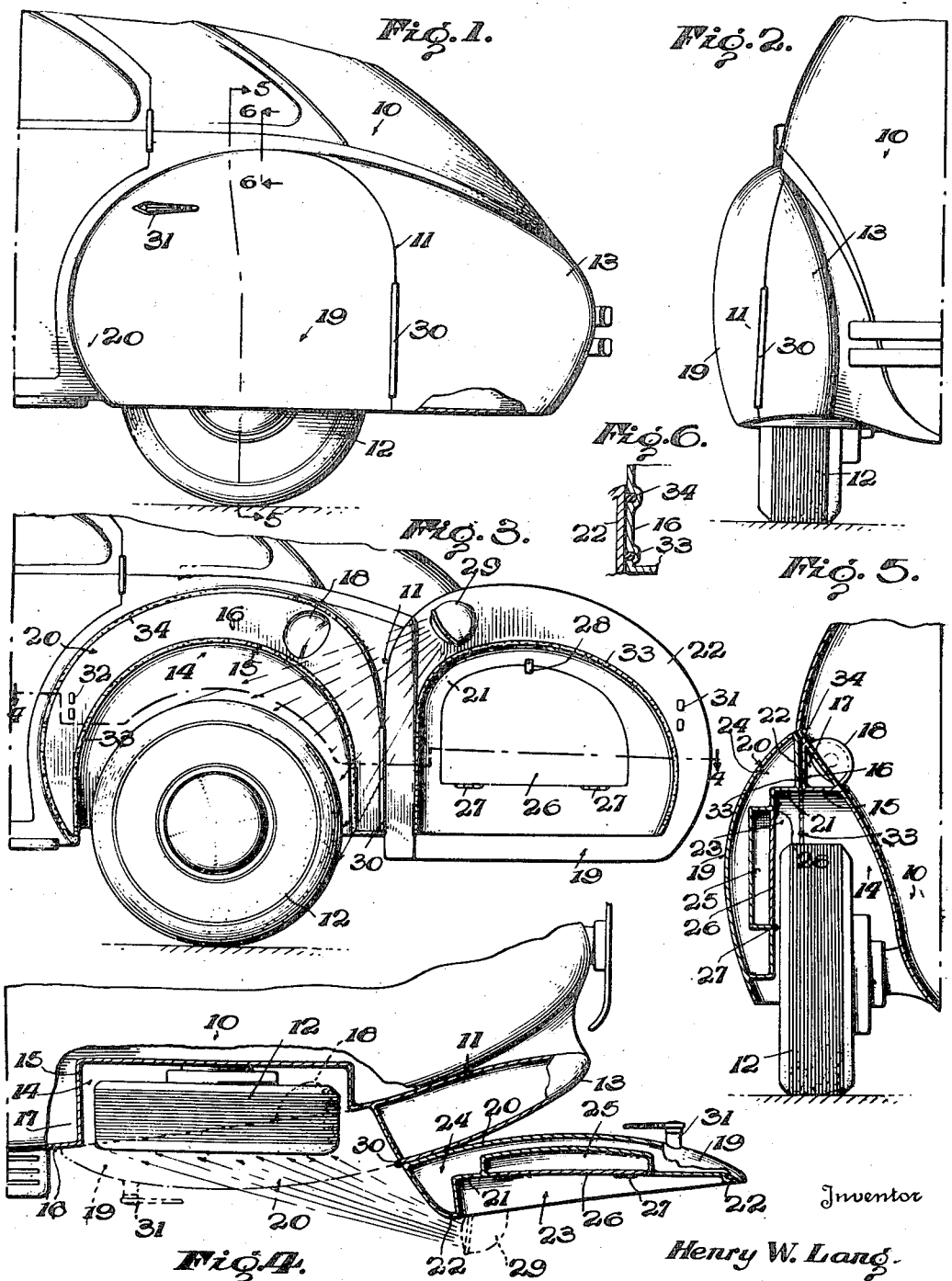
Inventor
Henry W. Lang.

Patented May 9, 1939

2,157,793

UNITED STATES PATENT OFFICE 2,157,793

AUTOMOBILE FENDER

Henry W. Lang, Concord, N. H.

Application August 5, 1938, Serial No. 223,359

7 Claims. (Cl. 280—153)

My invention relates to automobile fenders.

An important object of the invention is to provide an automobile fender which will afford the maximum coverage of the wheel, yet afford ready access to the wheel, for changing the wheel or the tire.

A further object of the invention is to provide an automobile fender of the above mentioned character having an electric lamp mounted upon the movable element of the fender, so that the light is properly projected upon the wheel, when the movable element is brought to the open position to afford access to the wheel.

A further object of the invention is to provide a fender of the above mentioned character, which may be made in contours or designs of fenders now generally in use.

A further object of the invention is to provide means for affording ready access to the wheel, without materially altering the appearance of the fender.

A further object of the invention is to provide means for sealing off portions of the fender, to prevent the accumulation of mud or the like therein, and to utilize a portion of the same as a compartment for holding tools or the like.

Other objects and advantages of the invention will be apparent during the course of the following description.

In the accompanying drawing forming a part of this application and in which like numerals are employed to designate like parts throughout the same, Figure 1 is a side elevation of a rear automobile fender embodying my invention, the movable fender element being in the closed position, Figure 2 is an end elevation of the same, Figure 3 is a side elevation of the fender with the movable fender element in the open position, Figure 4 is a horizontal section taken on line 4—4 of Figure 3, Figure 5 is a transverse section taken on line 5—5 of Figure 1, and, Figure 6 is a detailed section taken on line 6—6 of Figure 1.

In the drawing, wherein for the purpose of illustration is shown a preferred embodiment of my invention, the numeral 10 designates the body of an automobile, provided with a rear fender 11 upon each side. Each fender encloses the major portion of a rear wheel 12, as shown.

The fender comprises a stationary portion 13, which is arranged next to the body 10 of the automobile and securely attached thereto, in the usual manner. This stationary portion 13 has a recess 14 for receiving the wheel 12 and to permit of the relative vertical movement between the wheel and the body of an automobile. The recess 14 is defined by a curved wall 15. The stationary portion 13 of the fender also includes an outer transversely flat relatively wide wall 16, forming with the wall 15 a chamber 17, which is completely closed off from the wheel, whereby mud or the like cannot enter the chamber 17. A portion of the flat wall 16 is pressed in, affording a recess 18, to receive an electric lamp, to be described.

The numeral 19 designates the movable portion of the fender, comprising an outer wall 20, and an inner wall 21, connnected by a transversely flat relatively wide wall 22, affording a recess 23, which registers with the recess 14, for receiving the wheel 12. The flat wall 22 is adapted to have an even snug contact with the flat wall 16, affording a large contact area, thereby providing a strong stiff structure which is not liable to rattle, and which will withstand ordinary usage.

The outer wall 20, inner wall 21 and flat wall 22 afford a recess 24, which is completely closed off from the wheel, so that mud or the like will not enter the same. A pocket 25 is pressed outwardly from the inner wall 21, and this pocket is closed by a door 26, hinged at its lower end at 27, and held closed by a latch 28. This pocket may be used to hold tools or the like.

Rigidly mounted upon the flat wall 22 of the movable fender portion, is an electric lamp 29, and this lamp projects beyond the surface of the flat wall 22. When the movable portion 19 is in the closed position, the lamp 29 will enter the recess 18, but when the movable portion 19 is in the open position, Figure 4, the lamp 29 will then project outwardly beyond the movable portion, and will be disposed in a vertical plane outwardly of the plane of the wheel, and the electric lamp will then project a flood of light upon the rear wheel.

The movable portion 19 is hinged to the stationary portion 13, by a vertical hinge 30, and the forward or free end of the movable portion is provided with a latch 31, to engage with a companion keeper 32, carried by the flat wall 16. The movable portion 19 is therefore securely held in the closed position and may be released when desired to be swung to the open position.

The flat wall 16 is provided with a sealing strip 33, near its inner edge and a sealing strip 34 near its upper edge to engage with the flat wall 22. These sealing strips may be formed of elastic material, such as rubber, and held in position by any suitable means.

The electric lamp 29 may receive its current from any suitable source, and the current may be automatically turned on when the movable portion 19 is opened, if desired.

While I have shown my invention embodied in the rear fender of an automobile, which is preferred, yet it may be embodied in the front fender of an automobile.

In view of the foregoing description, it will be seen that the wheel receiving recess 14 is formed in the body of the automobile or the stationary fender portion. The rear end of the stationary fender portion extends longitudinally beyond the recess providing an end part, which is double walled and preferably closed at its bottom, and this end part projects laterally outwardly beyond the recess 14. The swinging portion 19 is double walled, and the hinge 30 is arranged adjacent to the outer walls of the end part and the swinging portion, so that the swinging portion is disposed in end-to-end relation to the end part when closed, and the outer walls of the end part and the swinging portion are substantially flush, when the swinging portion is closed, imparting to the outer surface of the entire fender an appearance of continuity.

It is to be understood that the form of my invention herewith shown and described is to be taken as a preferred example of the same and that various changes in the shape, size, and arrangement of parts, may be resorted to, without departing from the spirit of my invention or the scope of the subjoined claims.

Having thus described my invention, I claim:

1. An automobile fender comprising a stationary inner portion which is provided with a wheel receiving recess and a relatively wide contact wall extending about the recess and disposed interiorly of the recess, an outer movable portion having a wheel receiving recess to register generally with the first named wheel receiving recess and having a relatively wide contact wall disposed exteriorly of its recess to engage the first named contact wall, means to hinge the movable portion to the stationary portion, and means to hold the movable portion in the closed position.

2. An automobile fender comprising a stationary portion, said portion having a wheel receiving recess and a relatively wide wall extending about the same, said portion extending longitudinally beyond the recess for providing an end part projecting laterally outwardly beyond such recess, a movable portion having a wheel receiving recess to register generally with the first named recess and having a relatively wide wall surrounding its recess to engage with the first named wall, a generally vertical hinge arranged adjacent to the outer walls of said end part and movable portion and connecting them, and means to hold the movable portion in the closed position.

3. An automobile fender comprising a stationary portion, said portion having a wheel receiving recess, said portion having a part extending longitudinally beyond the recess for providing an end part which projects laterally outwardly beyond the recess, a horizontally swinging movable portion connected with the end part so that the movable portion is disposed in end-to-end relation to the end part when closed, the movable portion having a wheel receiving recess adapted to register generally with the first named wheel receiving recess means to hold the movable portion closed, and a lamp mounted upon the movable portion in such a position that it will project light upon side of the wheel when the movable portion is open.

4. An automobile fender comprising a stationary portion, said portion having a wheel engaging recess and a relatively wide contact wall extending about the recess, said wall having a lamp receiving recess, a horizontally swinging portion having a wheel receiving recess to register generally with the first named recess and having a relatively wide contact wall extending about the same to contact with the first named relatively wide contact wall, a lamp mounted upon said contact wall of the movable portion and projecting laterally outwardly beyond the same when the horizontally swinging portion is swung to the open position and arranged to enter the lamp receiving recess when the horizontally swinging portion is in the closed position, a generally vertical hinge arranged adjacent to the outer walls of the stationary portion and the movable swinging portion and connecting them, and means to hold the movable portion in the closed position.

5. An automobile fender comprising a stationary portion, said portion having a wheel receiving recess and a contact wall extending about the recess, a horizontally swinging portion embodying inner and outer walls, the inner wall being bent inwardly to produce a wheel receiving recess to register generally with the first named recess, the horizontally swinging portion having a contact wall extending about its recess to engage with the first named contact wall, a generally vertical hinge arranged adjacent to the outer walls of the stationary portion and swinging portion and connecting them, and means to hold the swinging portion in the closed position.

6. An automobile body having a wheel receiving recess, a stationary fender portion arranged upon one side of the recess and projecting laterally beyond the same, a double walled swinging fender portion having a wheel receiving recess to register generally with the first named recess, a hinge connecting the stationary fender portion and the swinging fender portion and arranged adjacent to the outer surfaces of the same so that said surfaces are generally flush when the swinging portion is in the closed position.

7. An automobile body having a wheel receiving recess and a stationary fender portion upon one side of the recess and projecting laterally beyond the same, a double walled swinging fender portion, having a wheel receiving recess to register generally with the first named recess and having a pocket for receiving tools or the like, a hinge connecting the ends of the stationary fender portion and the swinging fender portion and disposed adjacent to the outer faces of the same.

HENRY W. LANG.